United States Patent [19]
Jack et al.

[11] 3,870,500
[45] Mar. 11, 1975

[54] APPARATUS FOR BENDING GLASS SHEETS

[75] Inventors: Harry Ross Scarlett Jack, Springfield; Peter Henry Richards, Kenilworth; Kenneth George Skelding, Hollywood, all of England

[73] Assignee: Triplex Safety Glass Company Limited, London, England

[22] Filed: Mar. 12, 1974

[21] Appl. No.: 450,341

[30] Foreign Application Priority Data
July 20, 1973 Great Britain............... 34704/73

[52] U.S. Cl....................... 65/273, 65/275, 65/289, 65/374
[51] Int. Cl............................................ C03b 23/02
[58] Field of Search ............. 65/106, 273, 275, 287, 65/289, 374

[56] References Cited
UNITED STATES PATENTS 3,220,817  11/1965  Malobicky et al................ 65/106 X
3,220,818  11/1965  Barch et al. ........................... 65/106
3,536,464  10/1970  Seymour........................... 65/106 X Primary Examiner—Arthur D. Kellogg
Attorney, Agent, or Firm—Burns, Doane, Swecker & Mathis

[57] ABSTRACT

A hot glass sheet cut to shape for use in the manufacture of a vehicle window is supported in a near-vertical position on its lower edge on a carriage as it is heated and moved between co-operating male and female dies. When between the dies lifting fingers mounted on the bottom of at least one of the dies move beneath the supported lower edge of the sheet, and as the dies close the lifting fingers are raised sufficiently to lift the hot glass sheet from the carriage and provide support for the sheet as it is bent.

16 Claims, 11 Drawing Figures

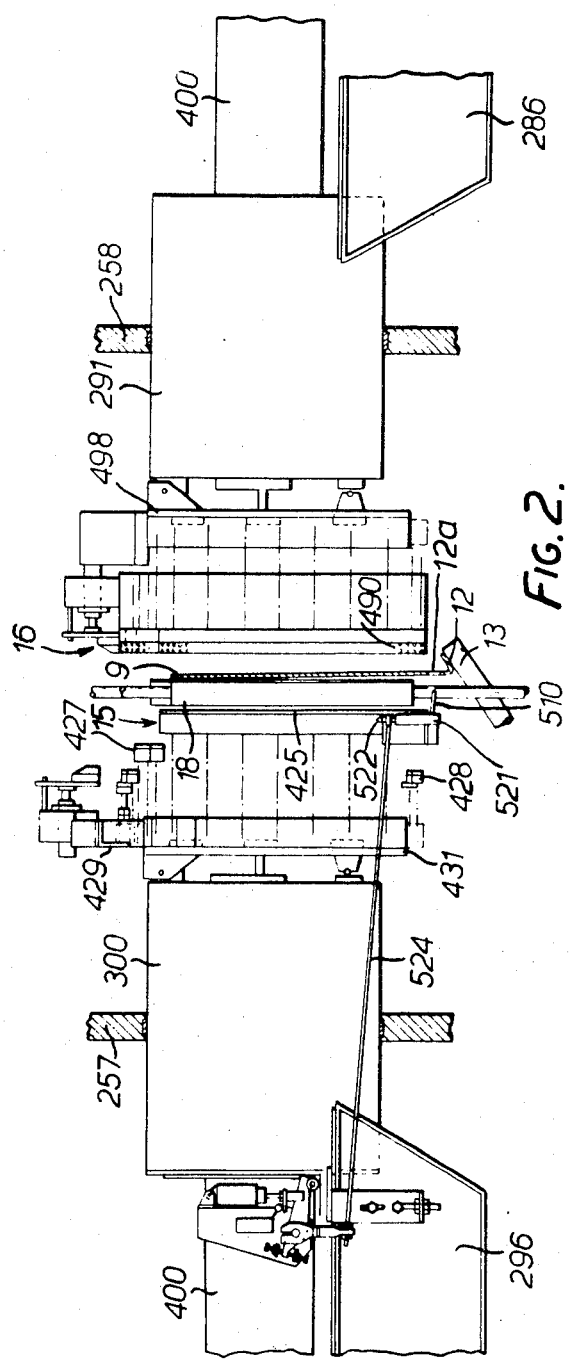
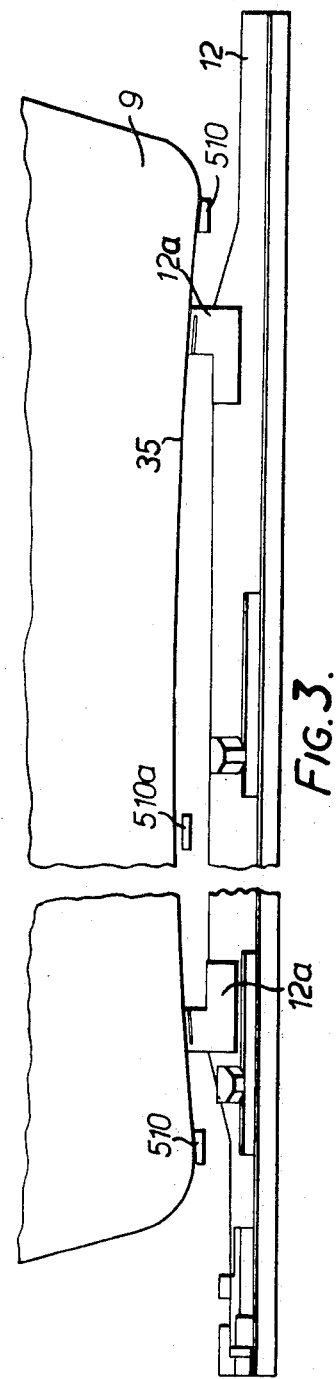
FIG. 2.
FIG. 3.

APPARATUS FOR BENDING GLASS SHEETS

BACKGROUND OF THE INVENTION

1. Field of the Invention

This invention relates to the bending of hot glass sheets. In particular the invention relates to apparatus for bending glass sheets which are to be subsequently toughened or annealed and used in the manufacture of windows for vehicles, for example motor vehicle windscreens and aircraft windscreens.

A glass sheet processed by the apparatus of the present invention may be toughened and then used alone as a vehicle windscreen, or may be either toughened or annealed for use as one of the laminates of a composite laminated glass windscreen.

It is customary to laminate two thin sheets of glass togeteher to form a windscreen using an interlayer of transparent plastics material, for example polyvinylbutyral. In such a windscreen both sheets may be of annealed glass or both of toughened glass and in a current proposal a laminated windscreen having a dual fracture characteristic is fabricated using a sheet of annealed glass as the outer sheet and a sheet of toughened glass as the inner sheet.

With such a windscreen visibility is retained even if the outer annealed sheet is fractured by a sharp flying stone, while the inner toughened sheet fragments rapidly when struck by the head of an occupant of the vehicle.

2. Description of the Prior Art

Usually in the manufacture of a toughened glass sheet for use alone as a windscreen, the sheet of flat glass is first cut to the shape appropriate to the styling of the vehicle in which the windscreen is to be fitted and the cut edges of the sheets are then polished to remove defects resulting from the cutting operation. Then the glass is heated to a temperature suitable for bending, during traverse through a heating furnace while suspended by tongs from an overhead conveyor which then conveys the glass between vertical bending dies which close on to the glass sheet and bend the sheet to the desired curvature.

Thereafter the bending dies are opened and the glass is conveyed between blowing frames where the glass is toughened, or the glass is conveyed from the bending dies through an annealing lehr when an annealed glass sheet is required. Throughout this process the glass is suspended from tongs which grip the upper edge of the sheet.

In a process for bending two sheets of glass which are to have accurately matching curvature for subsequent lamination it has been customary to bend the glass by a sag-bending process in which the two sheets lying one on top of the other are placed horizontally on a sag-bending mould and then conveyed through an oven where the glass sheets are heated and sag together to the desired matching curvature.

In a more recently developed process for the toughening of glass, a sheet of flat glass cut to the desired shape is suspended by tongs in a heating furnace having an open mouth in the floor of the furnace, and when heated to bending temperature is lowered to a location between bending dies which close on to the suspended sheet and bend it to a desired curvature before the sheet is further lowered through a pre-cooling stage in which cooling air is blown on to the glass surfaces, followed immediately by quenching in a quenching liquid, which may for example be a mineral oil or a mineral oil with a minor amount of lower boiling point additive. Toluene or carbon tetrachloride are suitable additives. This process has been particularly effective for the production of high strength glass for aircraft windscreens, and bent and toughened glass of thickness 1.5 to 3 mm for use in the manufacture of laminated windscreens for motor vehicles.

Suspension of the glass sheets by means of tongs during heating and bending brings inherent problems of distortion of the glass sheet.

It has now been found that glass sheets can be processed while supported mechanically in an upright position by leaning against a mechanical support which, when the glass is being moved, is preferably a transient mechanical support, for example spaced rollers which are inclined at a small angle to the vertical as long as the support against which the glass leans is advancing at the same forward speed as the glass sheet itself so that no relative slipping takes place between the mechanical support and the glass. Contact of the glass surfaces with the roller surfaces may only be over small areas of the sheet, and as the sheet is upright, gravitational loading between the glass surface and the surfaces of the rollers is minimal so that there is a greatly reduced risk of marking of the sheet as compared with that customary with horizontal roller support. Further since the gravitational load on any part of the sheet, particularly when it is approaching its softening point, is kept to a mimimum, there is less risk of sagging of the sheet and sagging of the sheet between adjacent rollers is picked up by the next roller.

It is a main object of the present invention to provide apparatus for bending a glass sheet which is supported in a near-vertical position, without the use of tongs.

SUMMARY

The invention provides apparatus for bending a hot glass sheet including support means against which a hot glass sheet which is supported on its lower edge leans at a near-vertical angle, and co-operating male and female dies associated with said support means one of which dies is constructed to pass from behind and through said support means as the dies close on to the glass sheet. Forwardly projecting lifting fingers are mounted at the bottom of that one die, which fingers are normally downwardly depressed to pass beneath the supported lower edge of a hot glass sheet as the die passes through said support means, and an actuating mechanism for the lifting fingers is operable to raise the lifting fingers sufficiently to lift the glass sheet and provide support for the sheet as it is carried by said one die towards the other die.

In the preferred way of operating the invention the lower edge of the hot glass sheet is supported on a carriage which is brought to rest between the bending dies, and the lifting fingers are adjusted so that they lift the sheet from the carriage by just a sufficient amount to permit the carriage to be removed from beneath the sheet.

The lifting fingers may be flat fingers of spatulate form or may be of cylindrical form with rotatable ceramic sleeves for engaging the glass sheet to accommodate any sideways movement of the sheet.

The invention is particularly advantageous in glass sheet bending apparatus in which co-operating male and female dies are mounted in a tilting box which is heated and has an entrance in an end wall and an exit mouth positioned for removal of a sheet vertically from the box. A plurality of spaced-apart upright rollers are mounted in the box against which a hot glass sheet which is supproted on its lower edge leans at a near-vertical angle. The female die is a ring frame die made up of die sections shaped to pass from behind through the upright rollers to disengage the hot glass sheet from said rollers as the dies close on to the glass sheet, and the forwardly projecting lifting fingers are mounted at the bottom of the female die and pass beneath the supported lower edge of a hot glass sheet as the female die sections pass from behind through the upright rollers. The operating mechanism for the lifting fingers is operable to raise the lifting fingers sufficiently to lift the glass sheet and provide support for the sheet as it is carried by the female die towards the male die.

BRIEF DESCRIPTION OF THE DRAWINGS

Some embodiments of the invention will now be described, by way of example, with reference to the accompanying drawings in which:

FIG. 2 is a more detailed schematic view of male and female bending dies in the bending apparatus as seen from the outlet end of the apparatus, FIG. 3 is a front elevation of a carriage supporting a glass sheet for transportation through the furnace to the bending apparatus, FIG. 5 is a side elevation of the lifting finger assembly of FIG. 4.

DESCRIPTION OF THE PREFERRED EMBODIMENTS

Figure 1:
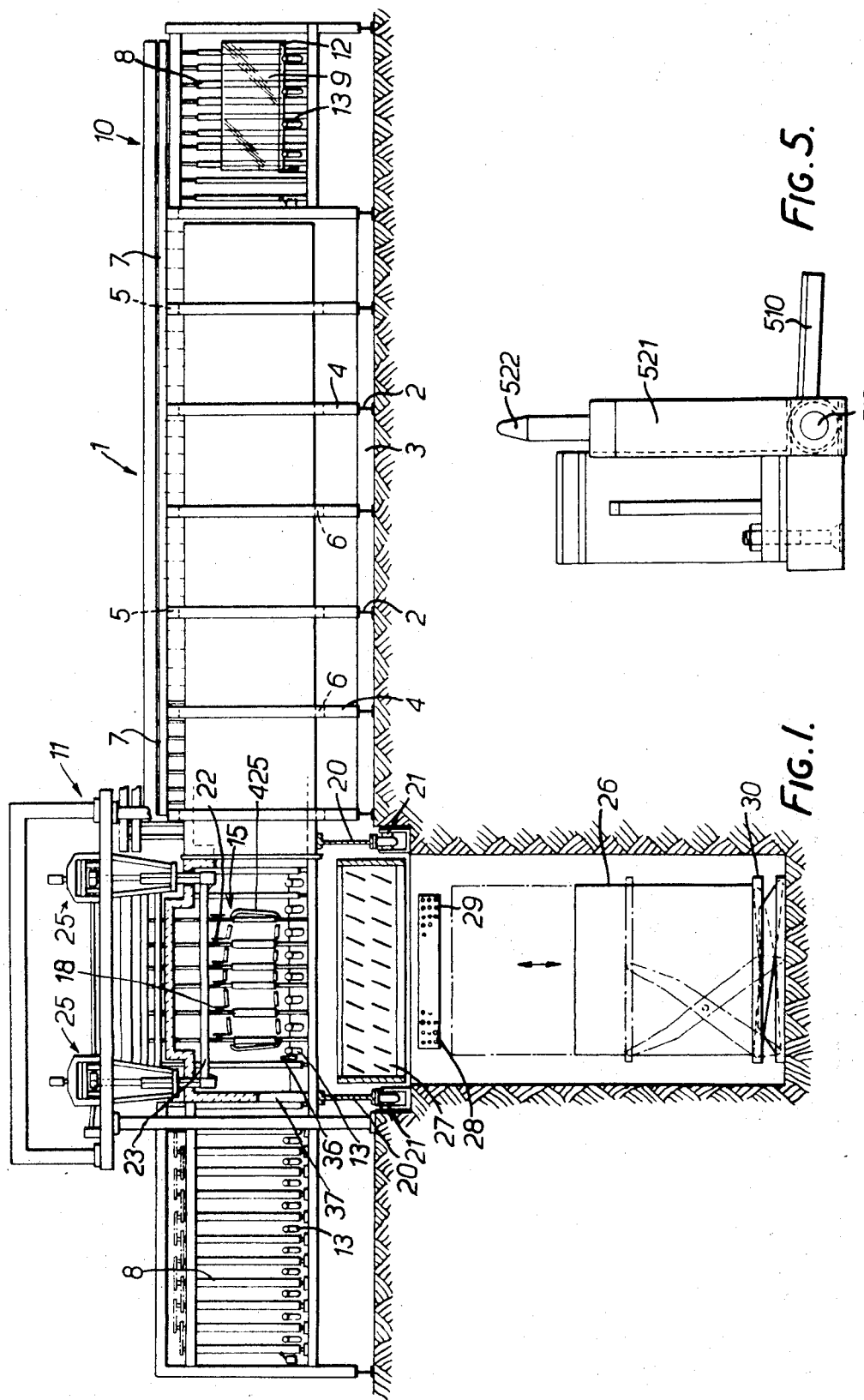
FIG. 1 is an elevation, partly in section, of apparatus for processing flat glass sheets including a loading station for glass sheets, a heating furnace, bending apparatus according to the invention and liquid quenching apparatus for quenching the bent glass sheets.

FIG. 1 illustrates the general arrangement of apparatus for heating, bending and toughening glass sheets which are conveyed through the apparatus throughout that operation in an upright disposition, that is in a near-vertical disposition during heating, and in a vertical disposition after bending and when being quenched in a chilling liquid.

A furnace chamber is indicated generally at 1 and has a cross-section of rectangular form and is supported at an angle to the vertical of about 5° in a basic girder framework which includes base girders 2 which are joined at their ends by cross girders 3. From the ends of the base girders there extend upright girders 4 which are at an angle of for example 5° to the vertical. The upper ends of the upright girders 4 are connected together by cross girders 5 which are inclined at an angle of aobut 5° below the horizontal.

The floor of the furnace is supported by cross girders 6 which extend below the lower ends of the upright girders 4. A downwardly sloping step in the furnace floor which slopes towards the bottom of one side wall permits any cullet which falls to the floor to be collected at outlets near the bottom of the side walls, which outlets are closed by hinged doors.

The furnace 1 is a refractory-lined, metal structure having side walls which extend upwardly from the floor and an integral roof construction which is hung from the upper girders 5. Longitudinal girders 7 fixed along the top of the furnace provide support for gear boxes housing the upper ends of a plurality of spaced-apart, upright, near-vertical rollers 8 which define an inclined support for sheets of glass 9 which are to be conveyed through the furnace 1 for bending and subsequent liquid-quench toguhening or annealing.

The rollers 8 are asbestos-covered or of heat-resisting stainless steel and are each mounted at an angle of from 2° to 10° to the vertical e.g. 5°, and form part of a conveyor for the sheets 9 which extends right through the furnace 1 from a loading station indicated generally at 10 to a bending station 11 which includes bending apparatus according to the invention. The rollers are 6.5 cm in diameter and are spaced 19 cm apart in the furnace. The spacing between rollers may be up to 30 cm in the region of the outlet end of the furnace where the glass reaches its final temperature. At the inlet end of the furnace where the glass is at a low temperature, the spacing may be greater, for example 38 cm or more providing there are sufficient rollers to support the whole length of the glass sheet in a stable condition.

The conveyor includes a movable support in the form of a carriage 12 on which the lower edge of the glass sheet 9 is seated, as shown in detail in FIG. 3, and bottom stub rollers 13 which project through spaces between the upright rollers 8 near the bottom of those rollers both at the loading station 10 and in the furnace 1, and driving means for advancing the carriage 12 through the furnace with the glass sheet 9 leaning against the upright rollers 8.

The bottom stub rollers 13, which are also of heat-resistant stainless steel or asbestos covered, are mounted, in the embodiment illustrated, at acute angle of 50° to the upright rollers 8.

The carriage 12 which is also shown in FIGS. 2 and 3 is made of sheet steel bent to an angle so that the carriage is of V-section having faces which are at an angle to each other matching the acute angle between the axes of the upright rollers 8 and the stub rollers 13. These faces of the carriage engage frictionally both the rollers 8 and 13, which are driven at the same speed as will be described, so that the carriage carrying the sheet is advanced through the furnace by the frictional engagement with both the bottom rollers 13 and the upright rollers 8.

The upright face of the carriage carries two support plates 12a the upper edge of each of which is widened to provide a support shoulder whose upper surface has a non-slip refractory coating. The lower edge of the glass sheet 9 is supported on the plates 12a with a gap between tje lower edge of the sheet and the upper edge of the upright face of the carriage.

Initially, only the upper edge of the sheet rests on the surface of the upright rollers 8 and the sheet is heated during its advance through the furnace. As it is heated the sheet tends to relax against the transient support for the sheet provided by the rotating surfaces of the rollers 8. The bottom edge of the sheet is located by specially shaped upstanding lands on the support plates 12a on the carriage so as to be slightly offset from the roller surfaces. A certain relaxation of the hot glass sheet, with deformation only below a predetermined limit, can take place while ensuring that the sheet remains in its upright disposition and that the lower edge of the sheet does not become displaced from the carriage.

In operation thermal conditions in the furnace are set and the time taken by the carriage carrying the glass sheet to transverse the heating zone is also set in dependence on the glass thickness, the height of the glass sheet, the angle of the support rollers to the vertical and the amount of offset of the lower edge of the glass sheet from the support rollers so as to achieve a predetermined temperature condition of the glass, the thermal and time settings being such as to permit the glass sheet as it is heated to relax against the support rollers only by an amount less than the maximum deformation of the glass sheet which is acceptable prior to bending.

As the sheet is heated during its advance through the furnace the supported sheet tends to relax against the surfaces of the rollers 8. With the heating zone set at a particular temperature the time taken for the glass sheet to traverse the heating zone is set in dependence on the glass thickness so as to achieve a predetermined temperature condition.

The temperature of the heating zone must be such that in the time taken for the glass sheet to reach the predetermined temperature condition, and depending on the thickness and height of the glass sheet, the angle of the supported sheet as governed by the angle of the rollers and the amount of offset on the lower edge of the glass sheet from the rollers, the glass sheet is only permitted to relax against the rollers by an amount less than a predetermined maximum acceptable deformation of the glass sheet.

It has been found that the near-vertical angle at whcih the sheet is initially supported when leaning against the rollers 8 may be in the range 2° to 10° for the heating of sheets of soda-lime-silica glass of thickness in the range 1.5 mm to 15 mm to a temperature in the range 580° C to 680° C or even 700° C which temperature range encompasses the usual temperature to which soda-lime-silica glass is heated prior to bending or toughening.

The upright, near-vertical rollers 8 are supported at their lower ends by self-aligning bearing blocks which are carried by parallel girders which run beneath the furnace floor and are supported on the specially shaped cross-girders 6.

The first 10 upright rollers 8 of the plurality of upright rollers constitute the loading station 10, and five bottom stub rollers 13 are respectively located between alternate spaces between the upright rollers 8.

At the bending station there are horizontally disposed bending dies 15 and 16. The female die 15 is a ring frame die made up of die sections, and co-operates with a male die 16 having a continuous bending surface. The dies illustrated are rigid dies but articulated wing dies with pivoting mechanism of known kind may be employed for bending complex windscreen shapes.

The dies are located in a tilting box 17 which is a refractory lined metal structure defining a heated chamber enclosing the bending dies, and through which there extends a conveyor comprising upright rollers 18 and bottom stub rollers 13 similar to those in the furnace and forming an extension of the conveyor. The upright rollers 18 in the tilting box 17 in the area occupied by the bending dies have short suppprot surfaces so that the sections of the female die ring frame can move through and beyond the rollers.

Beyond the outlet from the tilting box 17 there are further upright rolles 8 and bottom stub rollers 13 which form an extension of the conveyor for receiving each carriage 12 after the sheet which it supported has been lifted from the carriage for bending between the bending dies.

The drive to all the rollers at the loading station, in the furnace and in the tilting box is from the same motor. The rollers beyond the outlet from the tilting box have a separate drive and all the drives are controlled so that a glass sheet 9 can be fed slowly from the loading station towards the entrance to the furnace 1, thereafter accelerated into the furnace and is advanced through the furnace at an appropriate lower furnace creep speed as the glass is heated. At the end of the set heating time in the furnace the glass is accelerated from the furnace on to the short upright rollers 18 between the bending dies where the carriage is brought to rest with the hot glass sheet exactly located between the dies.

The tilting box is heated by gas burners, not shown, to the same temperature as the glass achieves during its passage through the furnace so that the bending dies are at the same temperature as the glass when it is presented to the dies for bending.

The tilting box 17 is mounted on a massive rocking girder frame including bottom beams 20 which are mounted on central pivots 21. An hydraulic ram attached centrally to one end girder of the rocking frame is operable to tilt the frame from an angle of about 5° to the horizontal, in which position the rollers 18 are aligned at the same angle to the vertical as the rollers 8 in the furnace, to a horizontal position of the frame in which the rollers 18 are vertical.

Initially the box is in its tilted position and the male bending die 16 is moved into position as the carriage 12 carrying a glass sheet 9 enters the tilting box and as soon as a hot glass is located between the dies the female die 15 moves through the rollers 18 to press the sheet against the male die and the rocking frame is titled to its horizontal position as bending of the sheet proceeds. During movement of the female die the glass sheet is lifted from the carriage by lifting fingers on the female die which pass between the lower edge of the glass sheet and the upper edge of the upright face of the carriage and lift the sheet from the carriage as will be described. When the rocking frame is horizontal, a tong bar 23 carrying glass-gripping tongs 22 is lowered from a hoist mechanism indicated at 25 which can itself be raised and lowered.

Provision is made for the tongs 22 to enter into recesses in the upper edges of the dies 15 and 16, so that they can grip the upper edge of the glass sheet as it is held between the bending dies.

When the glass sheet has been lifted from the carriage 12, the carriage is accelerated out of the tilting box on to the exit conveyor 8 before the rocking frame is rocked to its horizontal position when the dies open and the glass, now suspended vertically from the tongs, is lowered through a mouth in the bottom of the box for further treatment.

During its traverse through the furnace 1 the glass is heated to bending temperature for example 610° C at which temperature the glass can be satisfactorily bent and engaged by the tongs 22 without having become so soft as to endanger the finish of the glass surfaces during the bending operation.

When the bent glass is to be toughened, especially when a high strength glass is required, it is desirable to quench the glass from a higher glass temperature, e.g. 680° C, and in the embodiment illustrated in FIG. 1 the bent glass is reheated before it is quenched in a chilling liquid contained in a quench tank 26 which is located in a pit beneath the tilting box 17.

Just beneath the exit mouth in the bottom of the tilting box the glass passes between two banks of electric heaters 27 mounted in a pattern as illustrated facing both surfaces of the glass. During the passage of the glass downwardly between these heaters the glass at its bending temperature, e.g. 610° C, is heated throughout its thickness to a pre-quenching temperature nearer to the softening point of the glass e.g. 680° C. The bent glass may be lowered at uniform speed so as to maintain as near as practically possible uniform temperature throughout the whole glass sheet. Alternatively the glass may be accelerated as it is lowered between the heaters to produce in the glass a uniform temperature gradient from a high temperature at the bottom of the sheet to a lower temperature at the top of the sheet.

Such a temperature gradient may be induced in the glass sheet prior to bending by running lower sections of heaters on the furnace walls hotter than upper sections. For example the bottom of the furnace may be at 800° C, middle areas of the furnace walls at 750° C and the upper part of the furnace at 700° C. The bending dies are then heated by means of internal heaters to have a temperature distribution matching that induced in the glass sheet by such a furnace.

Below the boost heaters 27 are two blowing boxes 28 both of which are supplied with cooling air at ambient temperature, for example about 30° C, which is projected through nozzles 29 in the boxes uniformly towards both surfaces of the glass sheet. This pre-cooling of the glass surfaces after boost heating produces immediate temperature gradients from the central core to the surfaces of the glass. The core of the glass remains at about the temperature achieved between the boost heaters, and the pre-cooling of the glass surfaces is such that while the glass temperature is still above the strain point of the glass is immediately quenched in a chilling liquid before these temperature gradients decay.

As the glass is being lowered from the bending dies the tank 26 of chilling liquid is raised on a scissors-lift platform 30 which stands in the bottom of the pit. The tank 26 is raised until the top of the tank is located just below the bottom of the blowing boxes 28 with the surfaces of the chilling liquid in the tank at a predetermined small distance from the bottom nozzles 29 of the blowing boxes. The bent glass sheet in which core-to-surface temperature gradients exist as just described is immediately quenched in the chilling liquid as it passes from the ambience of the cooling air into the surface of the chilling liquid.

The chilling liquid is usually a mineral oil for example CYLREX FM (Trade Mark) and may have added to it a minor proportion of a low boiling point additive for example up to 1 percent by weight of toluene of carbon tetrachloride.

As the glass is immersed in the liquid in the tank 26 it comes to rest on a frame immersed in the tank, which frame is attached to the bottom one of the blowing boxes. The tongs are opened to release the glass on to the frame and after a time to permit the glass to cool in the liquid the tank is lowered, the glass is removed from the frame and degreased, and the toughened glass is stacked in a rack to complete its cooling to ambient temperature.

In another method of operation the tank 26 is not raised, the bent glass sheet comes to rest in the frame and remains in the frame for cooling in ambient air to produce an annealed glass sheet. An annealing enclosure may be moved on a horizontal track into position to receive a hot bent glass sheet in place of the frame.

Provision may be made for alternatively annealing and quenching sheets in succession as they are lowered from the bending dies so that successive sheets of a pair are respectively annealed and toughened. These sheets have been heated and bent under identical conditions and have matching dimensions and are eminently suitable for laminating together in the manufacture of a laminated windscreen.

The bottom edge 35 of the flat glass sheet 9 cut to a windscreen shape usually has a slightly concave shape, as shown in FIG. 3, which is reflected in a matching shape of the male and female dies. As the carriage 12 and the glass sheet 9 move into the tilting box inward movement of the female die begins under timed control. The rollers in the tilting box are slowed as the hot glass sheet moves between the bending dies and just before the carriage 12 has come to rest against a carriage stop 36 the glass is lifted from the shoulders 12a on the carriage and is supported between the bending dies on lifting fingers mounted at the bottom of the female die. There are two lifiting fingers 510 of spatulate form made of heat-resistant stainless steel, one at each end of the female die 15 and each having a flat surface for engagement beneath the lower edge of the hot glass sheet. In FIG. 3 the lifting fingers 510 are shown positioned below the lower edge of the glass close to the curved corners of that lower edge.

The female die 15 is mounted on a backing frame 431 which is adjustably mounted on a die mounting 300 which passes through a seal in the rear wall 257 of the tilting box, and is itself fixed to actuating means shown diagrammatically as a box girder 400 which has bearings, not shown, which run on tracks on the upper surfaces of main support beams 296 which are located on the pivoted frame.

The male die 16 is similarly mounted on a backing frame 498 which is adjustably mounted on a die mounting unit 291 which is slidable in a seal in the front wall 258 of the tilting box by actuating means 400 which runs on main support beams 286.

Initially when the female die 15 is retracted both the lifitng fingers are at a slightly downwardly sloping angle for example 2° below the horizontal so that they can be readily moved into position beneath the lower edge of the glass sheet. When the fingers 510 have been raised in a manner which will be described they lift the glass sheet upwardly clear of the shoulders 12a on the carriage so that the carriage can then be rapidly accelerated, by acceleration of the rollers in the tilting box, out through an exit 262 from the tilting box on to the extension of the conveyor at the lefthand side of the apparatus as indicated in FIG. 1.

The locating and actuation of the lifting finger 510 at one side of the female die is indicated generally in FIG. 2 and in more detail in FIGS. 4 to 8.

An identical lifting finger and operating mechanism is associated with the other bottom corner of the female die.

Each of the lifting fingers 510 is mounted from the female die 15 by means of a mounting which includes an L-shaped bracket 512 which is positioned on the outer side of two threaded rods 433 which form part of the adjuster assemblies for a side section 425 of the female die. The bracket 512 is strenghtened by a web 513 and is attached by bolts 514 to a clamping plate 515 positioned on the other side of the two threaded rods 433.

A bearing block 516 is attached to the foot of the bracket 512 and carries a shaft 518 to one end of which there is fixed a sleeve 519 which is integral with the lifting finger 510. The other end of the shaft 518 projects from the bearing block 516 and carries a spacer sleeve 520 and has an upwardly extending crank arm 512 fixed to that end and located in position by a grub screw at an angle slightly greater than 90° to the lifting finger 510. When the crank arm 521 is vertical the lifting finer 510 is at small angle e.g. 2° below the horizontal. An upwardly extending spike 522 is fitted into the top end of the crank arm 521 and a ring member 523 which forms the termination of an actuating rod 524, FIG. 8, fits over the spike 522. The actuating rod 524 passes through a seal, not shown, in the rear wall 257 of the tilting box, and is connected to an actuating mechanism mounted on the side of one of the beams 400 of the female die actuator unit.

Figure 7:
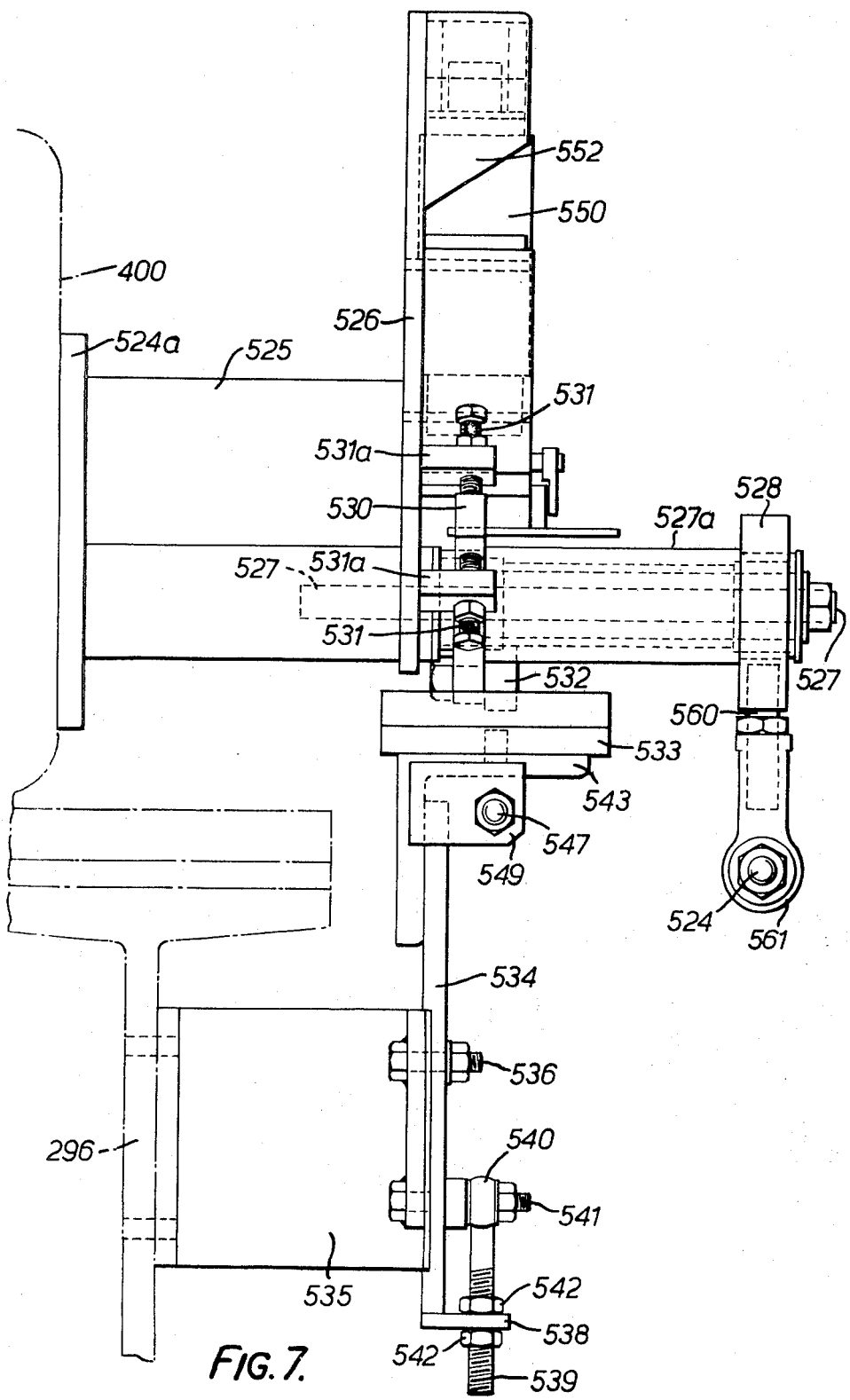
FIG. 7 is an end elevation of an actuating mechanism for the lifting finger assembly of FIGS. 4 to 6.
Figure 8:
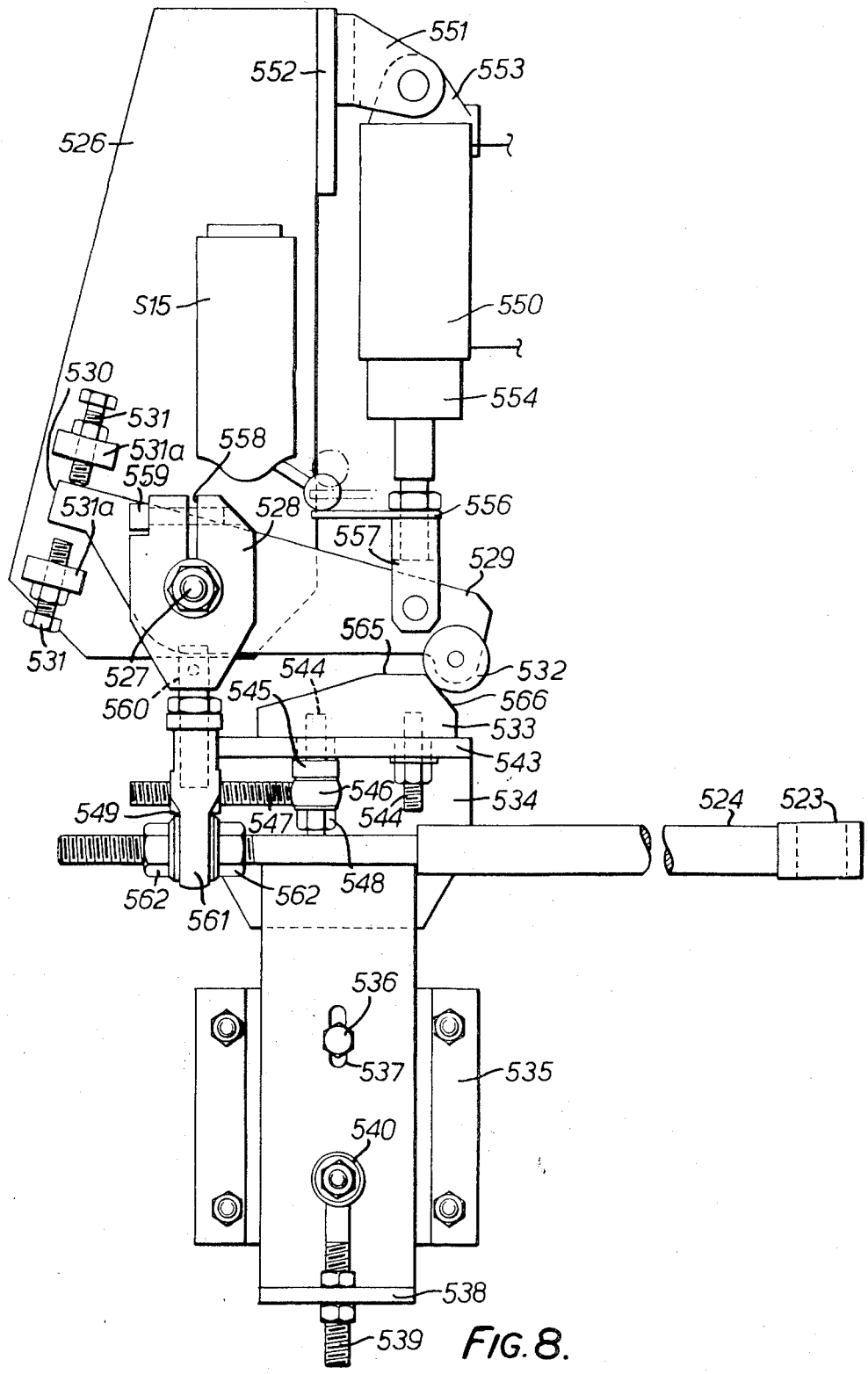
FIG. 8 is a front elevation of the actuating mechanism of FIG. 7.

FIGS. 7 and 8 show in more detail the actuating mechanism for the actuating rod 524. A base plate 524a is bolted to the outer side face of one of the box girders 400 of the female die actuator unit. A tubular boss 525 fixed to the base plate 524 carries a mounting plate 526. A shaft 527 is fixed into and extends outwardly from the tubular boss 525 and extends outwardly and carries on its outer end an actuating arm 528 to which the other end of the actuating rod 524 is attached.

A cam follower lever 529 is also pivoted on the shaft 527 and the outer end of the cam follower lever is formed as a lug 530 which moves between adjustable stop bolts 531 which are screwed through lugs 531a fixed to the mounting plate 526. The positions of the stop bolts 531 limits the extent of rotation of the cam follower lever 529.

The other end of the cam follower lever 529 carries a cam fllollower roller 532 which rides on a cam plate 533 which is supported by a mounting bracket 534 carried by a sub-bracket 535 bolted to the vertical web of one of the support girders 296. The mounting bracket 534 includes a vertical flange co-operating with an end flange on the sub-bracket 535 and is attached to the end flange of a bracket 535 by means of bolts 536 which extend through vertical slots 537 in the vertical flange of bracket 534. At the lower end of the vertical flange of bracket 534 there is welded a lug 538 which is drilled to receive a threaded rod 539 which has a ring member 540 at its uppper end which fits over a stub bolt 541 which is fixed to the end flange of the sub-bracket 535 and extends through a vertical slot cut in the vertical flange of bracket 534. Adjuster nuts 542 are fitted on the threaded rod 539, one on either sie of the lug 538. When the bolts 536 are loosened the height of the mounting bracket 534 and hence the cam plate 533 can be adjusted by turning the adjuster nuts 542 on the threaded rod 541.

The mounting bracket 534 has an upper horizontal mounting flange 543 on which the cam plate 533 is mounted by studs 544 fitted into the lower face of the cam plate 533 and extending downwardly through horizontal slots cut in the mounting flange 543. A nut on one of the studs 544 clamps the cam plate 533 to the plate 543. The other stud 544 extends downwardly through a spacer sleeve 545, a ring member 546 on one end of a threaded rod 547 and a locking nut 548. The other end of the threaded rod 547 passed through a lug 549 which is welded to the mounting flange 543. The extension of the rod 547 through the lug 549 is secured by means of lock nuts. This arrangement permits the position of the cam plate 533 to be adjusted horizontally.

A vertically positioned pneumatic cylinder 550 is mounted on the plate 526 by means of a pivot fork 551 whose base is secured to a flange 552 on the plate 526. A spindle fixed in the fork 551 carries pivotally a lug 533 on the head of the cylinder 550. The ram 554 of the cylinder has a shaft fixed in its lower end, which shaft carriers a striker plate 556 which projects horizontally to engage an actuating roller of a limit switch S15 mounted on the plate 526. The lower end of the shaft 555 carries a bifurcated coupling 557 between the arms of which the cam follower lever 29 fits. The lever 529 is coupled in the coupling 557 by a pivot pin.

The actuating arm 528 is, as shown, in the form of a plate member having a central hole which passes over the shaft 527 and formed with a clamping slot 558. A clamping bolt 559 passes through the separated upper parts of the plate to clamp the plate on to the shaft. A rod 560 is fixed into the lower end of the plate 528 and extends downwardly and is formed at its lower end as a ring member 561 which fits over the outer end of the actuating arm 524 and is secured thereto by lock nuts 562 which thread on to the outer threaded end of the shaft 524.

When the dies are open and the female die is fully withdrawn the roller 532 rests on the highest part 565 of the cam plate 533, the cylinder 550 being supplied with air under pressure to apply downward pressure on the cam follower lever 529. The actuating arm 524 is extended into the tilting box so that the lifting finger 510 is in its downward position ready to move beneath the lower edge of a glass sheet.

During the bending operation the female die actuator unit moves forwardly and at the point during its travel when the sectionalised frame of the female bending die passes between the upright rollers 18 in the tilting box, the downwardly extending lifting fingers 510, one at each side of the die, pass beneath the lower edge of the sheet. As the advance of the female die continues and the die frame sections contact the glass sheet which is resting against the rollers 18 and push the glass sheet away from contact with the rollers, both cam follower rollers 532 ride off the highest points 565 of the cam plates 533 and run down the sloping leading faces 566 of the cam plate under the action of the loading pneumatic cylinders 550. The cam follower levers 529 rotate clockwise up to the limit imposed by the upper stop bolts 531, and rotation of the actuating plates 528 clockwise withdraws the actuating rods 524 which pull the spikes 522 on the crank arms 521 backwardly to raise the lifting fingers 510 against the bottom edge of the glass sheet 9 and pick up the glass sheet 9 from the carriage 12.

The male die has already been brought into its forward bending position, and during its continuing forward movement the female die carries the hot glass sheet 9 now seated on the lifting fingers 510 into engagement with the stationary male die. Forward movement of the female die continues to complete the bending operation. Just prior to completion of the forward movement of the female die the rocking frame is tilted back to the horizontal position to bring the dies to a vertical position and gripping tongs are engaged with he upper edge of the bent glass sheet.

After bending when the bending dies are withdrawn the lifting fingers 510 are returned to their lowered position by switchng off the air supply to the cylinders 550 to cause anti-clockwise rotation of the cam follower levers 529 thereby advancing the actuating rods 524 and rotating the lifting fingers 510 to their lower inactive position.

When bending sheets of thin glass, for example up to 3 mm thick, the two lifting fingers 510 at the bottom corners of the female die are sufficient to bear the weight of the glass sheet for the time in which it is carried by those fingers as the bending dies close. For the bending of glass sheets of the greater thickness an additional lifting finger centrally of the glass sheet may be provided on the male die actuated by a mechansim similar to that just described, or whch may be operated directly by an hydraulic cylinder. The position of such a finger is indicated at 510a in FIG. 3.

Figure 9:
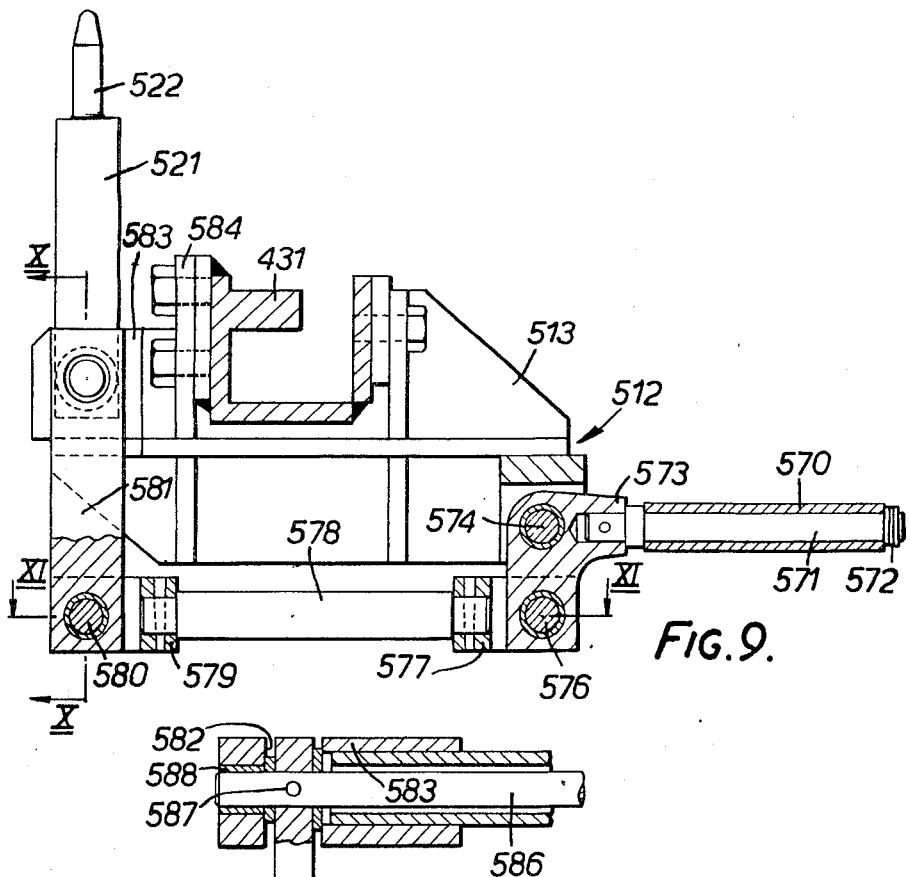
FIG. 9 is a side elevation, partly in section, of an alternative embodiment of lifting finger assembly shown in the arrrangement for mounting at the opposite bottom corner of the female bending die.
Figure 10:
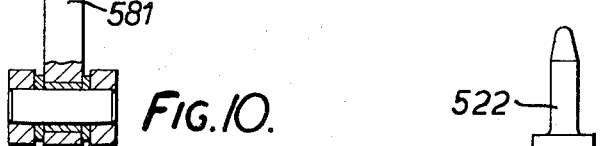
FIG. 10 is a section on line X—X of FIG. 9.
Figure 11:
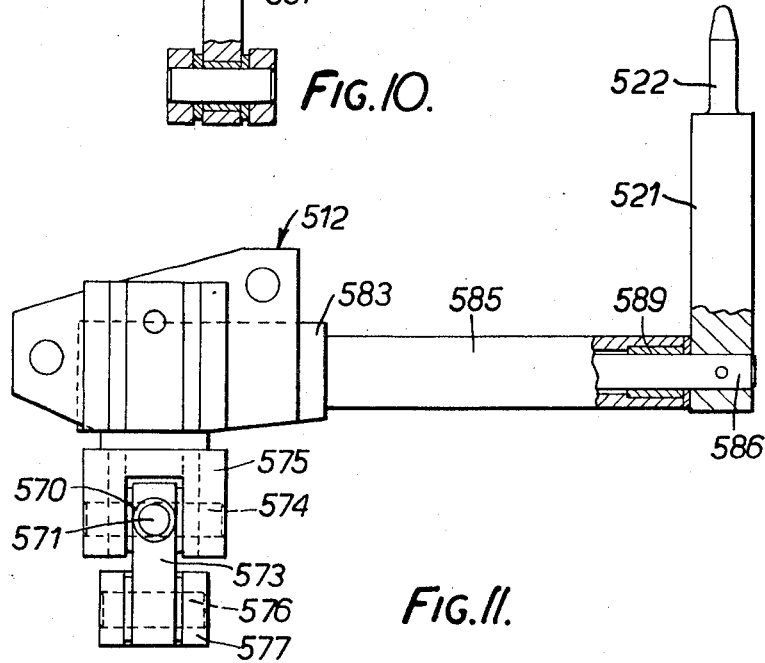
FIG. 11 is a section on line XI—XI of FIG. 9.

Another embodiment of the lifting fingers for attachment to the bottom corners of the female die 15 is illustrated in FIGS. 9, 10 and 11.

In this embodiment each of the lifting fingers is of cylindrical form consisting of a cylindrical sleeve of a refractory material for example a ceramic such as boron nitride which sleeve is illustrated at 570 and is mounted on a rod 571 so as to be freely rotatable on that rod being held in position by a circlip 572.

The rod 571 is fixed in an L-shaped arm 573 which is pivotally mounted on a horizontal spindle 574 which is fixed in a pivot block 575 which is itself fixed to the bracket 512 attached to the back frame 431 of the female die.

The lower end of the L-shaped arm 573 carries a pivot pin 576 to which is connected a fork 577 on the end of a rod 578 whose other end carries a fork 579 which is connected to a pivot 580 carried at the lower end of a lever arm 581 whose upper end extends through slot 582 in a bearing block 583 which is mounted on the rear end 584 of the bracket 512 which is fixed to the back frame 431 of the female die.

Figure 4:
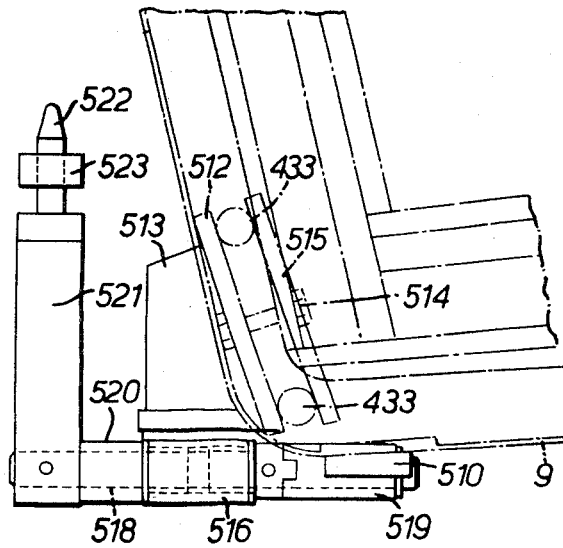
FIG. 4 is a front elevation of a lifting finger assembly attached to one bottom corner of the female bending die.
Figure 6:
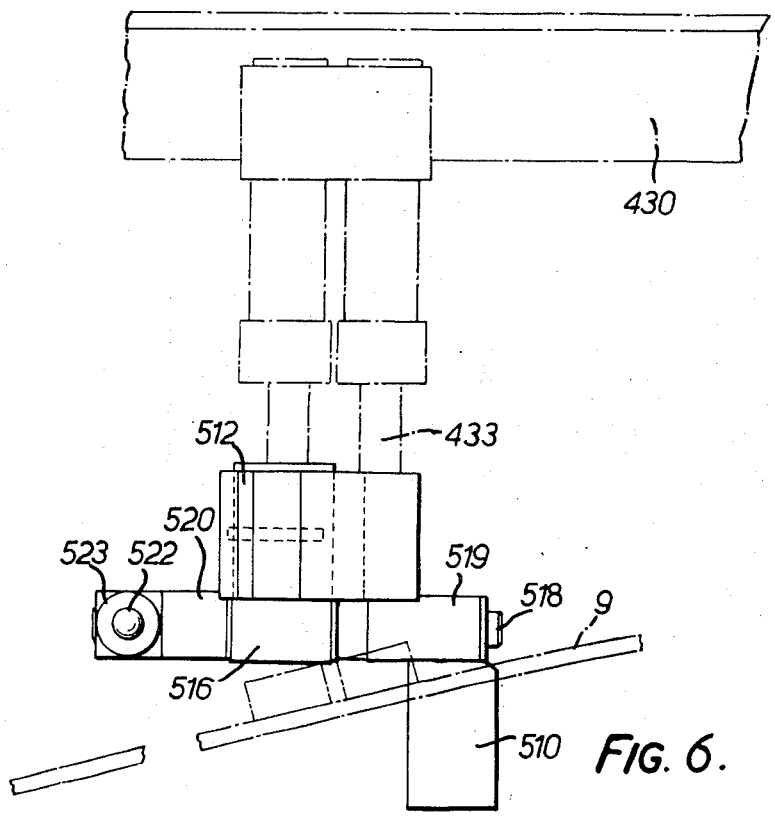
FIG. 6 is a plan view of the lifting finger assembly of FIGS. 4 and 5.

The bearing block 583 is fitted with a laterally extending tube 585 in which there is mounted a shaft 586 to which the upper end of the lever arm 581 is fixed by a dowel pin 587. The shaft 586 rotates in bearings 588 fixed into the bearing block 583 and in a bearing 589 in the end of the tube 8 away from the bearing block 583. The upwardly extending crank arm 521 is fixed to the free end of the shaft 586 which extends out of the tube 585 beyond the bearings 589. As already described the crank arm 521 has an upwardly extending spike 522 over which fits the ring member 523 on the actuating arm 524 in the same way as illustrated in FIG. 4.

Movement of the actuating rod 524 by the mechanism illustrated in FIGS. 7 and 8 rocks the crank arm 521 and causes the L-shaped arm 573 to pivot about its horizontal spindle 574 to raise the cylindrical lifting finger from its downwardly depressed position by an amount sufficient to cause the ceramic sleeve 570 to engage the lower edge of the glass sheet and to lift the sheet from the carriage.

Because the cylindrical sleeve 570 is rotatable on the rod 571 any tendency of the hot glass sheet to move sideways as it is being lifted and bent, is accommodated. The lifting finger at each bottom corner of the backing frame 431 of the female die is constructed as illustrated in FIGS. 9 to 11 and a similarly constructed and operated lifting finger of cylindrical form may be provided centrally of the lower edge of the female die. Alternatively a centrally located lifting finger of cylindrical form may be provided on the male die actuated by a mechanism similar to that just described or operated directly by an hydraulic cylinder.

We claim:

1. Apparatus for bending a hot glass sheet comprising support means against which a hot glass sheet which is supported on its lower edge leans at a near-vertical angle, co-operating male and female dies associated with said support means one of which dies is constructed to pass from behind and through said support means as the dies close on to the glass sheet, forwardly projecting lifting fingers mounted at the bottom of said one die, which fingers are normally downwardly depressed to pass beneath the supported lower edge of a hot glass sheet as said one die passes through said support means, and an actuating mechanism for the lifting fingers operable to raise the lifting fingers sufficiently to lift the glass sheet and provide support for the sheet as it is carried by said one die towards the other die.

2. Apparatus according to claim 1, wherein the lifting fingers are pivoted on horizontal spindles fixed to the bottom of said one die, each of the fingers is operated by a crank mechanism, and operating means for the crank mechanism is connected with actuating means for said one die and is operable to rotate the crank mechanism as said one die is advanced, thereby raising the lifting fingers as they pass beneath the lower edge of the hot glass sheet.

3. Apparatus according to claim 2, wherein the crank mechanism for each lifting finger includes an upstanding member whose upper end is engaged by an actuating rod which extends from said one die and is connected to a lever pivotably mounted on said actuating means for said one die and carrying a cam which is resiliently held against a fixed cam plate, whereby movement of the lever with said actuating means relative to the fixed plate causes rottation of the lifting finger crank mechanism.

4. Apparatus according to claim 1, wherein each lifting finger has a flat surface for engagement beneath the lower edge of a hot glass sheet.

5. Apparatus according to claim 4, whrein each lifting finger is of spatulate form.

6. Apparatus according to claim 1, wherein each lifting finger is of cylindrical form.

7. Apparatus according to claim 2, wherein each lifting finger consists of a cylindrical sleeve of refractory material which is rotatably mounted on a rod one end of which is pivoted on one of said horizontal spindles.

8. Apparatus according to claim 7, wherein the sleeve is of born nitride.

9. Apparatus for bending a hot glass sheet comprising a tilting box having an entrance in an end wall and an exit mouth positioned for removal of a sheet vertically from the box, a plurality of spaced-apart upright rollers in the box against which a hot glass sheet which is supported on its lower edge leans at a near-vertical angle, means for heating the interior of the box, co-operating male and female bending dies mounted in the box, the female die being a ring frame die made up of die sections to pass from behind through the upright rollers to disengage the hot glass sheet from said rollers as the dies close on to the glass sheet, forwardly projecting lifting fingers mounted at the bottom of the female die, which fingers are normally downwardly depressed to pass beneath the supported lower edge of a hot glass sheet as the female die sections pass from behind through the upright rollers, and an operating mechanism for the lifting fingers operable to raise the lifting fingers sufficiently to lift the glass sheet and provide support for the sheet as it is carried by the female die towards the male die.

10. Apparatus according to claim 9, wherein the lifting fingers are pivoted on horizontal spindles fixed to the bottom outer section of the female die, each of the fingers is operated by a crank mechanism, and operating means for the crank mechanism is connected with the female die actuating means and is operable to rotate the crank mechanism as the female die is advanced, thereby raising the lifting fingers as they pass beneath the lower edge of the hot glass sheet.

11. Apparatus according to claim 10, wherein the crank mechanism for each lifting finger includes an upstanding member whose upper end is engaged by an actuating rod which extends backwardly through the rear wall of the tilting box and is connected to a lever pivotably mounted on the female die actuating means and carrying a cam which is resiliently held against a fixed cam plate, whereby movement of the female die actuating means relative to the fixed cam plate causes rotation of the lifting finger crank mechanism.

12. Apparatus according to claim 9, wherein each lifting finger has a flat surface for engagement beneath the lower edge of a hot glass sheet.

13. Apparatus according to claim 12, wherein each lifting finger is of spatulate form.

14. Apparatus according to claim 9, wherein each lifting finger is of cylindrical form.

15. Apparatus according to claim 10, wherein each lifting finger consists of a cylindrical sleeve of refractory material which is rotatably mounted on a rod one end of which is pivoted on one of said horizontal spindles.

16. Apparatus according to claim 15, wherein the sleeve is of boron nitride.

* * * * *